United States Patent
De Sanctis et al.

(10) Patent No.: US 8,379,597 B2
(45) Date of Patent: Feb. 19, 2013

(54) METHOD FOR PREVENTING PING-PONG HANDOVER EFFECT IN MOBILE WIMAX NETWORKS

(75) Inventors: Alessandro De Sanctis, Milan (IT); Marco Rastelli, Cesano Boscone (IT); Daniele Tortora, Sesto s. Giovanni (IT)

(73) Assignees: Nokia Siemens Networks S.p.A, Cassina de Pecchi (IT); Nokia Siemens Networks Oy, Espoo (FI)

( * ) Notice: Subject to any disclaimer, the term of this patent is extended or adjusted under 35 U.S.C. 154(b) by 759 days.

(21) Appl. No.: 12/341,533

(22) Filed: Dec. 22, 2008
(Under 37 CFR 1.47)

(65) Prior Publication Data

US 2009/0274118 A1 Nov. 5, 2009

(30) Foreign Application Priority Data

Dec. 21, 2007 (EP) .................................... 07425814

(51) Int. Cl.
*H04W 4/00* (2009.01)
(52) U.S. Cl. ........ 370/331; 370/329; 455/438; 455/445; 455/436
(58) Field of Classification Search .......................... None
See application file for complete search history.

(56) References Cited

U.S. PATENT DOCUMENTS

| 7,263,358 B2 | 8/2007 | Chiou |
| 2004/0121777 A1* | 6/2004 | Schwarz et al. ........... 455/452.1 |
| 2004/0165561 A1* | 8/2004 | Chiou et al. .................. 370/338 |
| 2007/0015509 A1* | 1/2007 | Xiang ........................... 455/436 |
| 2008/0049677 A1* | 2/2008 | Hayashi ........................ 370/331 |

FOREIGN PATENT DOCUMENTS

| CN | 1717091 | 1/2006 |
| WO | WO 03/094539 | 11/2003 |
| WO | WO 2004/034715 | 4/2004 |
| WO | 2005/086377 | 9/2005 |

OTHER PUBLICATIONS

IEEE Computer Society and IEEE Microwave Theory and Techniques Society, "IEEE Standard for Local and Metropolitan Area Networks Part 16: Air Interface for Fixed Broadband Wireless Access Systems", IEEE Std 802.16/2004 (Revision of IEEE Std 802.16/2001), Oct. 1, 2004.

(Continued)

*Primary Examiner* — Ian N Moore
*Assistant Examiner* — Jackie Zuniga
(74) *Attorney, Agent, or Firm* — Staas & Halsey LLP

(57) ABSTRACT

To prevent a handover ping-pong effect between base-station in WiMAX-compliant networks, a priority level is assigned to the trigger causes for handover, and the prioritized causes are coded. Then codes are subdivided into a first class of unrestricted handovers and a second class of restricted handovers. The first class includes the highest priority handovers. The second class includes a subset of handovers with a high or normal priority intended for optimizing resources. Outside this subset the second class also includes handovers for power budget having a normal priority level. When an outgoing handover is decided, the actual serving BS permits or selectively suppresses the Handover Request to the target BS when the latter corresponds to the preceding serving BS for that mobile. The selection mechanism operates on the second class of restricted handovers, during a penalty time triggered by the occurrence of handover causes included in the second class subset.

7 Claims, 4 Drawing Sheets

Ping-pong Handover Prevention example

OTHER PUBLICATIONS

IEEE Computer Society and IEEE Microwave Theory and Techniques Society, "IEEE Standard for Local and Metropolitan Area Networks Part 16: Air Interface for Fixed and Mobile Broadband Wireless Access Systems". Amendment 2: Physical and Medium Access Control Layers for Combined Fixed and Mobile Operation in Licensed Bands and Corrigendum 1, IEEE Std 802.16e™-2005 and IEEE Std 802.16™-2004/Cor1-2005 (Amendment and Corrigendum to IEEE Std 802.16-2004) Feb. 28, 2006IEEE Computer Society and IEEE Microwave Theory and Techniques Society, "Draft Standard for Local and metropolitan area networks Part 16: Air Interface for Fixed and Mobile Broadband Wireless Access Systems—Corrigendum 2".

IEEE Computer Society and IEEE Microwave Theory and Techniques Society, "DRAFT Standard for Local and Metropolitan Area Networks Part 16: Air Interface for Broadband Wireless Access Systems", P802.16Rev2/D1 (Oct. 2007) Revision of IEEE Std 802.16/2004 as amended by IEEE Std 802.16f-2005 and IEEE Std 802.16e-2005.

Wimax Forum Network Architecture (Stage 3: Detailed Protocols and Procedures), Mar. 2007.

* cited by examiner

METHOD FOR PREVENTING PING-PONG HANDOVER EFFECT IN MOBILE WIMAX NETWORKS

CROSS REFERENCE TO RELATED APPLICATIONS

This application is based on and hereby claims priority to European Application No. EP07425814 filed on Dec. 21, 2007, the contents of which are hereby incorporated by reference.

BACKGROUND

1. Field

The embodiments discussed herein relate to broadband wireless telecommunication networks, and in particular to a method for a preventing ping pong handover effect in mobile WiMAX networks. References indicated with and used acronyms are reported at the end of the description.

More particularly, the embodiments apply to a Mobile Wireless Broadband Access network conforming to IEEE std 802.16-2004 as amended by IEEE 802.16e-2005 and corrected by IEEE 802.16-2004 Corrigendum 2. The embodiments can be extended also to Mobile Wireless Broadband Access network conforming to IEEE 802.16 Rev2. The present embodiments apply as well to the WiMAX Forum specifications (i.e. Stage 2 and Stage 3 specifications).

2. Description of the Related Art

As reported in the WiMAX Forum, Mobile WiMAX is a broadband wireless solution that enables convergence of mobile and fixed broadband networks through a common wide area broadband radio access technology and flexible network architecture. The Mobile WiMAX Air Interface adopts Orthogonal Frequency Division Multiple Access (OFDMA) for improved multi-path performance in non-line-of-sight environments. Scalable OFDMA (SOFDMA) is introduced in the IEEE 802.16e Amendment to support scalable channel bandwidths from 1.25 to 20 MHz.

FIG. 1, that will be discussed later on, shows the reference architecture for a WiMAX network. In its essentiality, we see a mobile station (MS) wirelessly connected to a base station BS1 through R1 interface. The MS, because of various causes, can request the network to handover the user's connection from an actual radio channel to another of a different cell (or the same cell). The BS can trigger a handover procedure due to several reasons, either in reply to a MS request or autonomously (e.g. for radio channel quality, traffic load conditions, resource status). Some triggering causes require immediate handover execution (imperative handover), otherwise call drops or severe interference can occur. Other triggering causes do not require immediate execution but are intended for optimisation purposes only: e.g. for individual radio link optimisation (power budget handover) or for network resource optimisation (handover for load balancing criteria, etc). In the second case the target BS may immediately trigger handover back to the previous serving BS because the previous serving BS may provide better radio channel conditions. Such a back and forth can be iterated many times before it is stopped (generally at the expiration of a counting), giving rise to the so called "Ping-pong" effect that may cause system instability, a call drop increase, and QoS degradation due to unnecessary increase of handover events At the present stage of WiMAX standardization, even when looking for the nearest cellular technologies, the teaching is always to inhibit ping-pong handovers independently of their typology. Additional interference is introduced by this way of proceeding, as also those handovers that should be useful to do will be prevented, i.e. power budget handovers repeatedly commanded between the two BSs because the mobile is really going back and forth between the two cells.

In addition, WiMAX, GSM, and W CDMA, in order to reduce system instabilities, adopt hysteresis margins for handover. An effect of hysteresis margins is to prevent the MS from connecting immediately with the most suitable cell, reducing, in this way, the ping pong effect. The larger the hysteresis, the lower the system performance, as the MS remains for a longer time connected with a suboptimal cell. Large hysteresis values are actually particularly harmful in low frequency reuse systems, such as WiMAX, due to additional interference generated on close neighbouring cells.

SUMMARY

In view of the state of the art described, it is an aspect of the embodiments to provide a criterion to inhibit only those kind of handovers which are actually ping-pong handovers, and permitting handovers to a different BSs so that large resource wasting hysteresis is avoided.

The embodiments achieve the aspect by providing a method for controlling handovers of the radio connection to a mobile station between base stations of a cellular communication network, includes the following operations executed by base stations: The first operator involves assigning a priority level to every handover trigger cause includible in a handover request or confirm message and coding the prioritized handover trigger causes. Next, there is a subdividing the codes so obtained into a first class associated with unrestricted handovers and a second class associated with handovers subjected to restriction. This is followed by storing the identifier of a previous serving base station for an incoming handover accepted for a certain mobile station. Then comes starting a penalty timer if the code of the prioritized handover trigger cause referred to the accepted handover belongs to a given subset of the second class. This is followed by deciding a new valid condition to trigger a handover request for that mobile station. The operation involves detecting if the target base station identifier is equal to the stored identifier, detecting if the code of the prioritized handover trigger cause referred to the new valid condition belongs to the second class, and the penalty elapsed time is below a configurable value. This is followed by suppressing the issuing of a handover request for that mobile station if all the conditions at the preceding step are simultaneously met, otherwise issuing a handover request including the handover trigger cause.

According to an aspect of the embodiments, the second coding class includes codes of handover trigger causes dealing with network resources allocation optimization and traffic distribution, as load balancing, having priority level high or normal.

According to another aspect of the embodiments, the first coding class mainly includes codes of handover trigger causes dealing with imperative handovers, as UL/DL Level/Quality or alarms, having the highest priority level.

According to another aspect of the embodiments, the code of prioritized power budget handover trigger cause, having normal priority level, is outside the given subset of the second coding class. A power budget is a power control feature that uses handover to prevent neighbour cell interference, improving the quality of transmission.

According to another aspect of the embodiments, the handover trigger causes are transmitted by vendor specific TLV information element included in handover request messages and handover confirm messages.

According to another aspect of the embodiments, handover performance counters are provided per handover causes, since the information is signalled via handover messages to the target base station and to the access service network gateway.

According to another aspect of the embodiments, the cellular telecommunication network has a radio interface based on OFDMA or SOFDMA technique.

The above disclosure is a sound demonstration that the problem of the invention is really solved by the proposed method. In fact, a selective mechanism is implemented to selectively inhibit those handovers intended for network resource optimisation and load balancing purposes only. While, even though the power budget handover is a trigger cause with priority level lower than the inhibited ones, the corresponding handover request is not suppressed and ping pong handovers are admitted for the mobile, as it is really generated by a physical cause, that is to say, the mobile is moving across a borderline between two cells. By so doing the level of the interferences is reduced and harmful oscillations are avoided. As a consequence system stability and Quality of Service (QoS) are both improved while call drop probability decreases.

BRIEF DESCRIPTION OF THE DRAWINGS

These and other aspects and advantages will become more apparent and more readily appreciated from the following description of the exemplary embodiments, taken in conjunction with the accompanying drawings of which.

Figure 1:
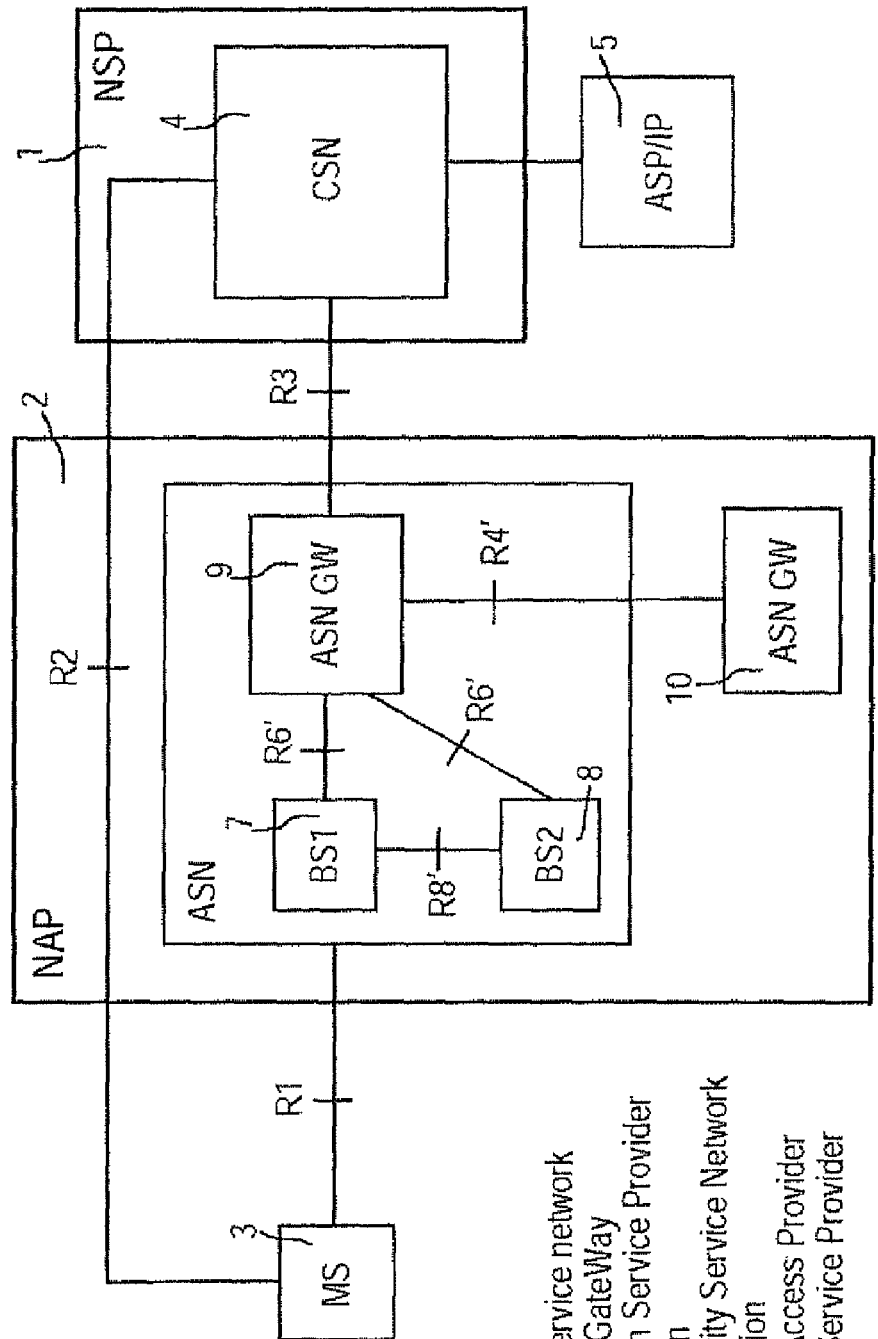
FIG. 1 shows the reference architecture for WiMAX fixed and mobiles network as an example of possible scenario for implementation.

TABLE 1 reports possible Handover causes encoding and priority level.

TABLE 2 reports handover causes subjected to handover inhibition.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

With reference to FIG. 1 we see a WiMAX reference model including three main functional blocks, namely: Network Service Provider (NSP) 1, Network Access Provider (NAP), and Mobile Station (MS) 3. The NSP 1 includes a Connectivity Service Network (CSN) 4 connected to an external Application Service Provider (ASP/IP) 5 also providing IP services. The NAP 2 includes an Access Service Network (ASN) 6 composed of a first Base Station (BS1) 7 and a second Base Station (BS2) 8 connected to each other through interface R8', and an Access Service Network Gateway (ASN GW) 9 connected to BS1 7 and BS2 8 through interface R6' and to another ASN GW block of the same NAP block 2 but external to ASN 6 through interface R4'. The ASN GW 9 is connected to the CSN block 4 through R3 interface. The MS 3 is wireless connected to the ASN block 6 (either BS1 and/or BS2) through R1 Interface, and to CSN block 4 (via NAP block 2) through R2 interface.

The operation is detailed in the referenced standardization, except for the description of interfaces marked with apostrophe (R6', R8', R4') which includes an upgrade of corresponding standard interfaces that will be described with reference to FIGS. 2A and 2B. The focus of the operation dealing with the description mainly addresses concerns between base station handovers at the R6' interface, via ASN GW 9, using handover triggering causes transferred to BSs 7 and 8 through the R6' interfaces. Such information elements are also communicated to the other ASN GW 10 through the R4' interface. Handover between base stations via R8' interface will be planned for future releases of WiMAX.

At present stage of the WiMAX Forum Specifications, exchange of handover triggering cause signalling between BSs is not considered. Therefore, the target BS is not aware of the handover cause. Section 5.3.2.203 of the WiMAX Forum Specifications defines "Vendor Specific TLV", an optional TLV that allows adding vendor specific information on R4 and R6 interfaces. Without limitation, the embodiments make use of Vendor Specific TLV to add information about the handover trigger causes.

Figure 2A:
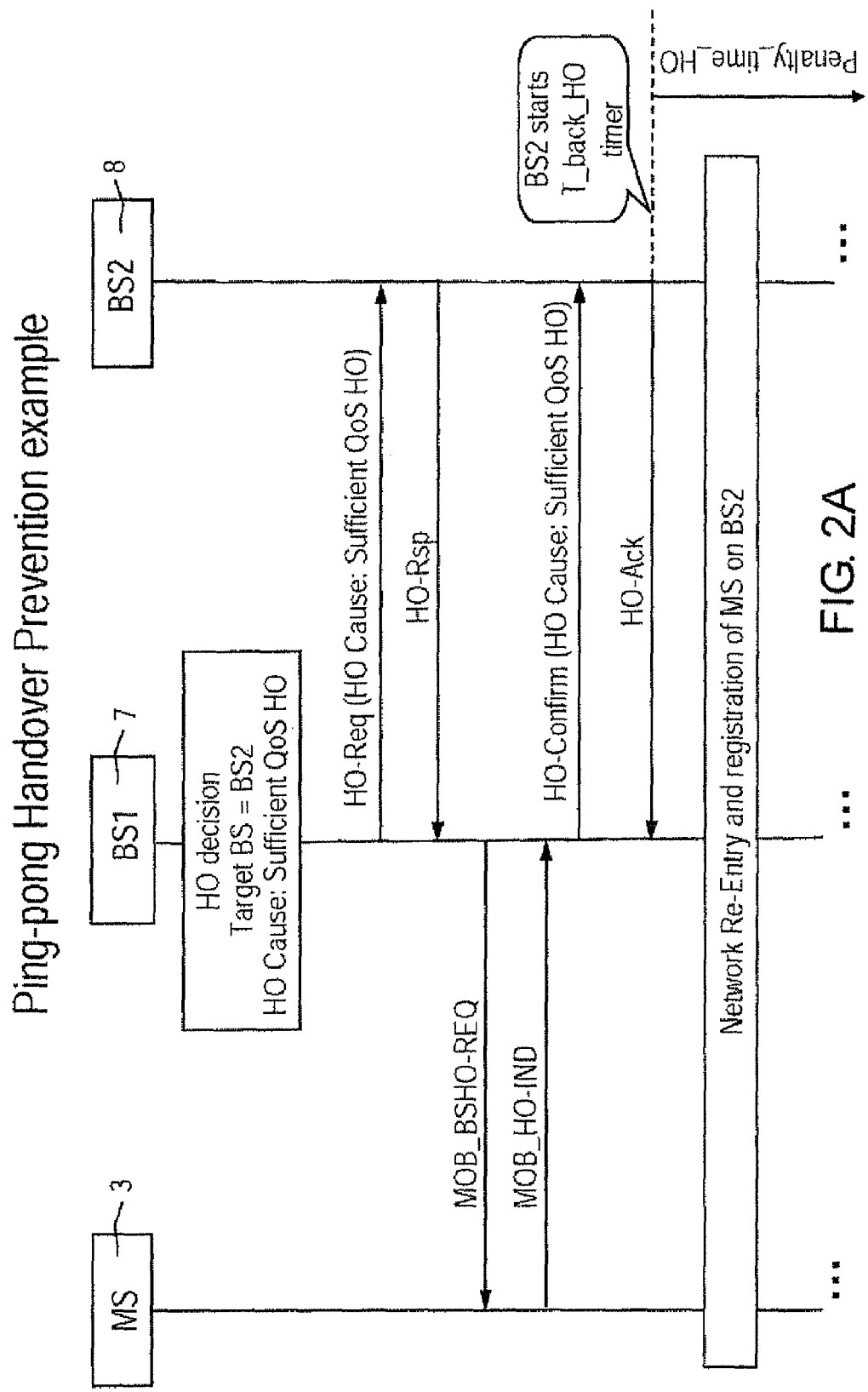
FIGS. 2A-2C indicate a message time diagram for selective handover delaying according to the method.
Figure 2B:
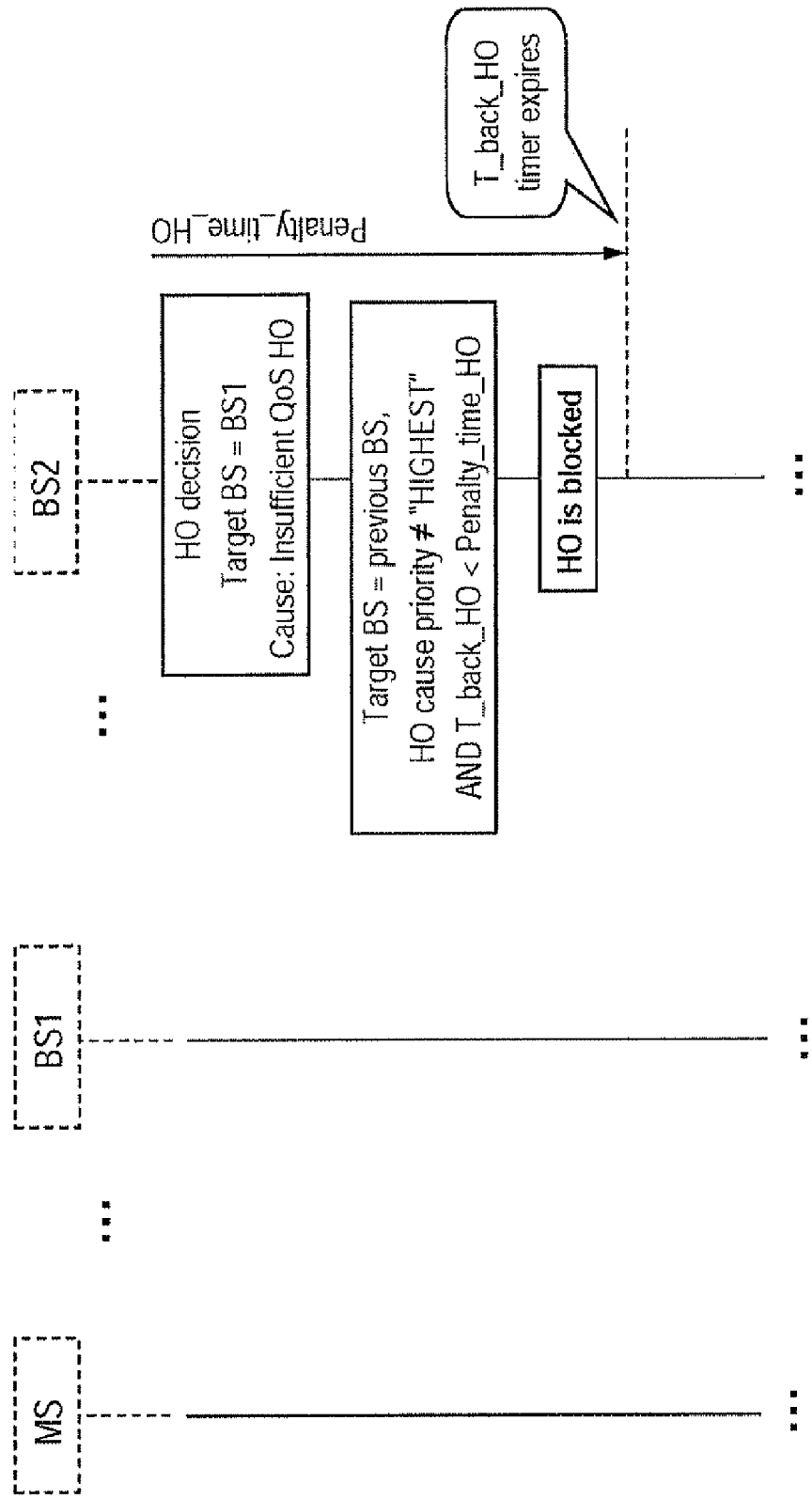
Figure 2C:
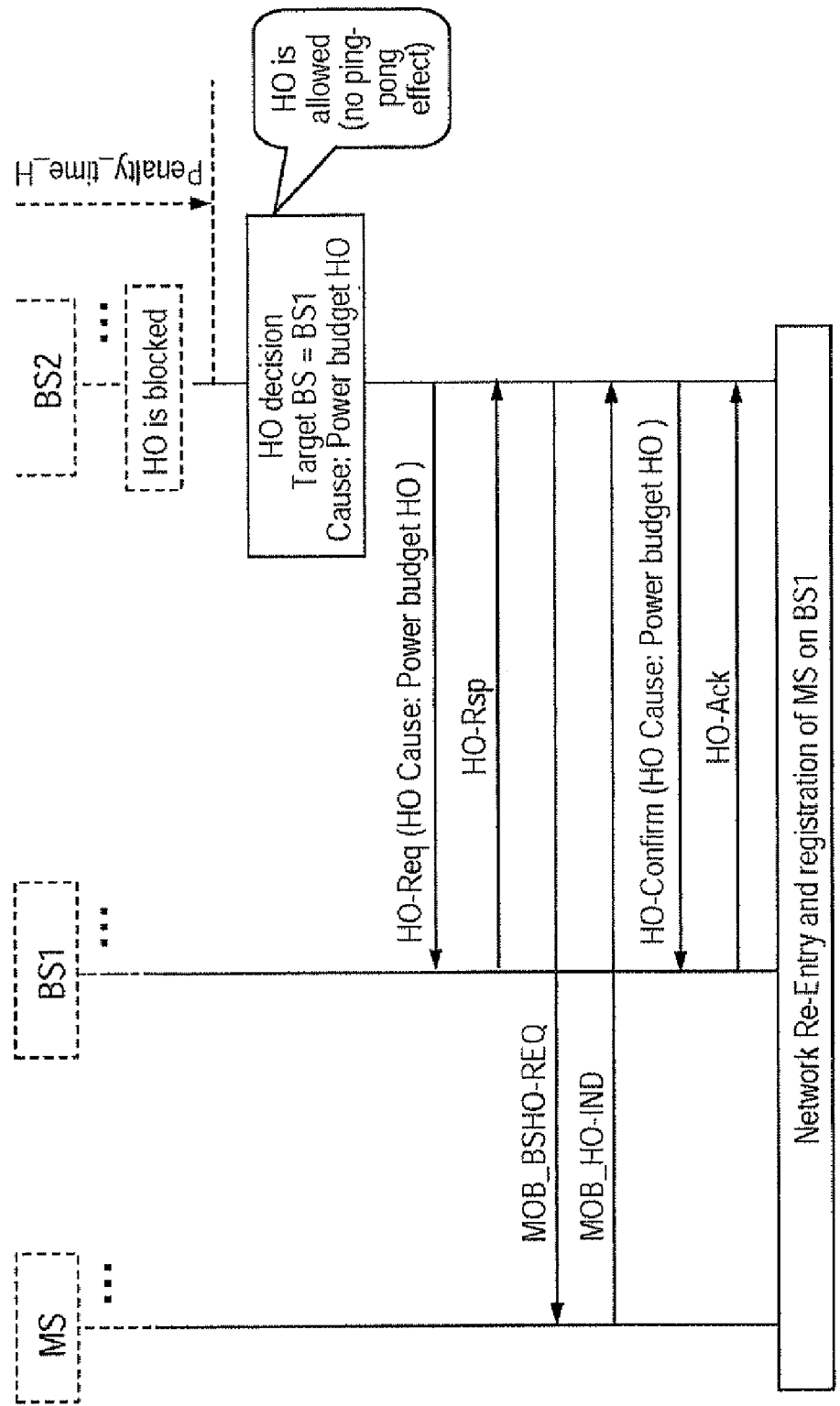

The message sequence chart of FIGS. 2A-2C involves the following three network elements: MS (1), BS1 (7), and BS2 (8) dealing with base station handovers where the risk of bouncing is selectively prevented. For the sake of simplicity, messages to/from the ASN GW 9 are not indicated; this node performs a relay function between BS7 and BS8 via respective R6' interfaces. An understanding of this time diagram is facilitated by the following preliminary description.

As previously stated, the serving BS shall signal on R6' interfaces the cause for Handover (HO) initiation by appending Vendor Specific TLV to HO_Request and HO_Confirm messages. The handover causes are encoded in Vendor Specific Information Field of the Vendor Specific TLV. This way of proceeding is not mandatory and any other type of suitable message formats could be used to the same aim.

TABLE 1 reports the following information elements:
Column 1: proprietor denominations or names of the main handover triggering causes;
Column 2: example of possible handover causes encodings;
Column 3: example of priority levels assigned to handover triggering causes.

Other or different values can be considered for trigger names, handover causes encoding and priority levels, however, the mechanism proposed here of encoding and transmitting the handover cause information can still be used.

Ping-pong handover shall be prevented by the following steps:
Storing in the Target Base Station (BS) the information concerning the handover cause, defined in TABLE 1, for each incoming handover.
In case the trigger condition for the incoming handover was one of those listed in TABLE 2, a timer "T_back_HO" (FIG. 2A) can be started for the incoming mobile station (MS).
Every time an incoming handover occurs, the new serving BS maintains a Base Station Identifier (BS ID) of the previous Serving BS.
Every time a trigger condition for handover is met for a certain MS, BS checks to see if the Target BS is different from the previous serving BS of that MS. In such a case the handover procedure proceeds as usual.
In case the Target BS corresponds to the previous Serving BS, the priority level associated with the handover cause is considered:
if the priority level is "Highest" (HO causes encoding 0, 1, 2, 7) the handover is allowed and the handover procedure proceeds as usual;

if the priority level is "High" or "Normal" (HO causes encoding 3, 4, 5, 6) and

T_back_HO elapsed time is below a configurable parameter "Penalty_time_HO", handover procedure can be stopped and the handover is not executed.

Standard power budget expression (PBGT(n)) provides a method of comparing a path loss of an MS and serving cell (PBGT(s)) with a path loss of the MS and a potential handover target cell (PBGT(t)). A handover may be initiated when (PBGT(n)) exceeds a handover threshold value selected by a system operator. The handover threshold within a communication system may be selected to be as small as possible (above normal signal variations) to minimize transmitter power levels and mutual interference within a reusing system.

Turning attention to FIG. 2B, the time diagram represented is devoted to the performance of an handover of the MS connection from BS1 to BS2 under non imperative Sufficient QoS handover cause, prioritized as Normal and encoded with 4 in Table 1. This optimization handover is promoted by BS1 upon BS2 as it evaluates whether MS has enough QoS on that radio link. The first message HO_Req including "Sufficient QoS HO" in the field HO cause is sent by BS1 to BS2 on R6' interface, via ASN GW relay function. The HO cause information element in the HO_Req message is in agreement with vendor specific TLV information. The following steps are a completion of the handshake between BS1 BS2 and BS1 MS upto the BS2 acknowledgement of the handover and MS is registered to BS2. BS2 triggers a T_back_HO timer contemporarily to the transmission of HO_Ack message to BS1 and a penalty counting starts up to the configurable interval Penalty_time_HO.

In FIG. 2C, BS2 in its turn, commands a handover back to BS1 as the QoS of MS radio link is judged insufficient. A ping-pong is avoided by the multiple comparisons of successive steps and the handover is blocked until the T_back_HO timer expires, that is to say, until Penalty_time_HO elapses. Now the blocked handover might be enabled without ping pong effect being experienced as sufficient time is elapsed. After T_back_HO timer expires any type of handover is admitted or allowed, for example, the one for Power budget cause. A message HO_Req including "Power budget" in the field HO cause is sent by BS2 to BS1 on R6' interface. The following steps are a completion of the handshake between BS2 BS1 and BS1 MS upto the time BS1 acknowledges the handover and MS is registered to BS1 anew.

Although the embodiments have has been described with particular reference to a preferred embodiment, it will be evident to those skilled in the art, that the embodiments are is not limited thereto, but further variations and modifications may be applied without departing from the scope as defined by the annexed claims.

TABLE 1

Example of HO causes encoding and of priority levels

| Trigger name | Handover cause encoding | Priority level |
|---|---|---|
| UL received level HO | 0 | Highest |
| UL received quality HO | 1 | Highest |
| MS initiated handover due to alarm criteria | 2 | Highest |
| Power budget HO | 3 | Normal |
| Sufficient QoS HO | 4 | Normal |
| Insufficient QoS HO | 5 | High |
| HO due to traffic reasons | 6 | Normal |
| Handover due to DL quality or to DL received level | 7 | Highest |

TABLE 2

Handover causes subject to handover inhibition

| Trigger name | Handover cause encoding |
|---|---|
| Sufficient QoS HO | 4 |
| Insufficient QoS HO | 5 |
| HO due to traffic reasons | 6 |

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method, executed by a base station, for controlling handovers of a radio connection to a mobile station between base stations of a cellular communication network, comprising:

assigning a priority level to handover trigger causes includes in a handover request or confirm message and coding the prioritized handover trigger causes to obtain codes;

subdividing the codes into a first class associated with unrestricted handovers and a second class associated with handovers subjected to restriction;

storing an identifier of a previous serving base station for an incoming handover accepted for a mobile station;

starting a penalty timer if the code of the prioritized handover trigger cause of an accepted handover belongs to a given subset of the second class;

deciding a new valid condition to trigger a handover request for the mobile station, comprising:

detecting if a target base station identifier is equal to the stored identifier, detecting if the code of the prioritized handover trigger cause of the new valid condition belongs to the second class, and determining that a penalty elapsed time is below a configurable value; and suppressing issuance of a handover request for the mobile station if all the conditions of the deciding step are simultaneously met, otherwise issuing a handover request including the handover trigger cause.

2. The method of claim 1, wherein the second coding class includes codes of handover trigger causes dealing with network resources allocation optimization and traffic distribution, including load balancing, having a priority level high or normal.

3. The method of claim 1, wherein the first coding class includes codes of handover trigger causes dealing with imperative handovers, including Power Level, Quality of transmission, alarms, having a highest priority level.

4. A method, executed by a base station, for controlling handovers of a radio connection to a mobile station between base stations of a cellular communication network, comprising:

assigning a priority level to handover trigger causes included in a handover request or confirm message and coding the prioritized handover trigger causes to obtain codes;

subdividing the codes into a first class associated with unrestricted handovers and a second class associated with handovers subjected to restriction;

storing an identifier of a previous serving base station for an incoming handover accepted for a mobile station;

starting a penalty timer if the code of the prioritized handover trigger cause of an accepted handover belongs to a given subset of the second class;

deciding a new valid condition to trigger a handover request for the mobile station, comprising:

detecting if a target base station identifier is equal to the stored identifier, detecting if the code of the prioritized handover trigger cause of the new valid condition belongs to the second class, and determining that a penalty elapsed time is below a configurable value; and suppressing issuance of a handover request for the mobile station if all the conditions of the deciding step are simultaneously met, otherwise issuing a handover request including the handover trigger cause.

5. The method of claim 1, wherein the handover trigger causes are transmitted by vendor specific Type/Length/Value information elements included in handover request messages and handover confirm messages.

6. The method of claim 1, wherein handover performance counters are provided for handover causes.

7. The method of claim 1, wherein the cellular telecommunication network has a radio interface based on an OFDMA or SOFDMA technique.

* * * * *

UNITED STATES PATENT AND TRADEMARK OFFICE
CERTIFICATE OF CORRECTION

PATENT NO.        : 8,379,597 B2
APPLICATION NO.   : 12/341533
DATED             : February 19, 2013
INVENTOR(S)       : Alessandro De Sanctis et al.

Page 1 of 1

It is certified that error appears in the above-identified patent and that said Letters Patent is hereby corrected as shown below:

In the Claims:

Column 6, Line 35, In Claim 1, delete "includes" and insert -- included --, therefor.

Columns 7-8, Col. 7 (1-20); Col. 8 (1-9); Delete "4. A method, executed by a base station, for controlling handovers of a radio connection to a mobile station between base stations of a cellular communication network, comprising: assigning a priority level to handover trigger causes included in a handover request or confirm message and coding the prioritized handover trigger causes to obtain codes;
subdividing the codes into a first class associated with unrestricted handovers and a second class associated with handovers subjected to restriction;
storing an identifier of a previous serving base station for an incoming handover accepted for a mobile station;
starting a penalty timer if the code of the prioritized handover trigger cause of an accepted handover belongs to a given subset of the second class;
deciding a new valid condition to trigger a handover request for the mobile station, comprising:
detecting if a target base station identifier is equal to the stored identifier,
detecting if the code of the prioritized handover trigger cause of the new valid condition belongs to the second class, and
determining that a penalty elapsed time is below a configurable value; and
suppressing issuance of a handover request for the mobile station if all the conditions of the deciding step are simultaneously met, otherwise issuing a handover request including the handover trigger cause." and
insert -- 4. The method of claim 1, wherein the code of a prioritized power budget handover trigger cause, having normal priority level, is outside the given subset of the second coding class. --, therefor.

Signed and Sealed this
Seventh Day of May, 2013

Teresa Stanek Rea
*Acting Director of the United States Patent and Trademark Office*